(No Model.)
A. J. LONGENECKER.
FRUIT PACKER.
No. 479,650.  Patented July 26, 1892.
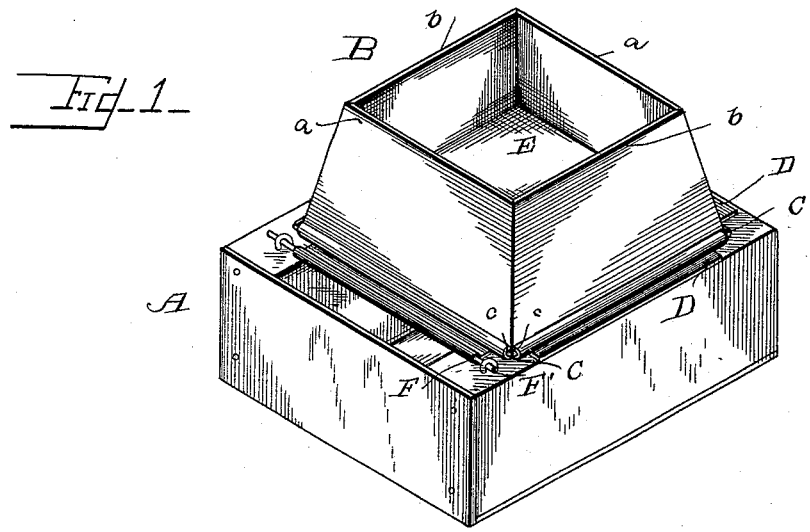
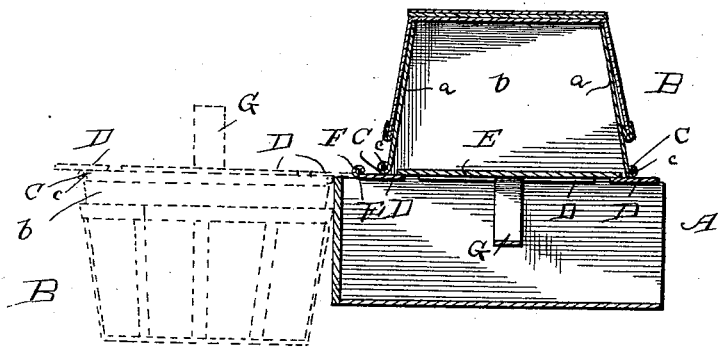
Witnesses
Jesse Heller
Phil C. Masi
Inventor
A. J. Longenecker
by E. W. Anderson
his Attorney

UNITED STATES PATENT OFFICE.

ANDREW J. LONGENECKER, OF ELK GROVE, CALIFORNIA.

FRUIT-PACKER.

SPECIFICATION forming part of Letters Patent No. 479,650, dated July 26, 1892.

Application filed January 16, 1892. Serial No. 418,310. (No model.)

*To all whom it may concern:*

Be it known that I, ANDREW J. LONGE-NECKER, a citizen of the United States, and a resident of Elk Grove, in the county of Sacramento and State of California, have invented certain new and useful Improvements in Machines for Packing Grapes and other Small Fruit; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of the invention in perspective, and Fig. 2 is a vertical section.

This invention has relation to certain new and useful improvements in machines for packing grapes and other small fruit; and it consists in the novel construction and combination of parts, as hereinafter specified.

In the accompanying drawings, illustrating one of my improved packers, the letter A designates the chambered base or support, and B the form supported on said base. This form is composed of the side pieces $a$ $a$ and $b$ $b$, which are of any suitable material, such as sheet metal. The lower edge of each piece is turned up, as shown, to form a loop or eye $c$, and through these eyes is passed a continuous angular wire C, said parts acting as a hinge and permitting the pieces $a$ $a$ and $b$ $b$ to be turned outwardly or brought up together to constitute the form. To the bottom of each of the pieces is also soldered a horizontal flange D, which projects on both sides of the piece, the inner edge portion of the flanges serving to support a loose and removable bottom E. The outer edge portion of the flanges serve as bearings on the base to hold the form in shape. The outer edge of one of said flanges is formed with an eye or loop F, through which is passed a wire F', held loosely in staples secured in the base and acting as a pintle, on which the entire form may be turned over into inverted position at the end of the base, as shown. To the under side of the bottom E is secured a handle G.

The operation of the device is as follows: The form is turned bottom down on the base or support and is filled with the fruit to be packed. The basket is then placed on the top of the form and the whole is then inverted. The form is then withdrawn from the basket by means of the handle G, leaving the fruit neatly packed in said basket.

In the drawings I have shown the form as tapering inwardly or reduced in sectional area from top to bottom for use with a basket which is larger at the top than at the bottom; but I desire it known that I also construct the forms with straight sides for straight baskets; also, that the general shape and size of the form may be varied for different styles of boxes.

The device above described is simple both in construction and operation, and forms a convenient and effective means for the purpose.

Having described this invention, what I claim as new, and desire to secure by Letters Patent, is—

The herein-described device for packing fruit, comprising the chambered base or support and the form, said form consisting of the side and end pieces $a$ $a$ and $b$ $b$, having each an eye or loop at its lower edge, a continuous angular wire passed through said eye or loop and forming therewith the hinges for said side and end pieces, the horizontal flange on the lower edge of each of said pieces and projecting both inwardly and outwardly therefrom, one of said flanges being hinged to the base or support, and the removable bottom supported on the inward projections of said flanges, substantially as specified.

In testimony whereof I affix my signature in presence of two witnesses.

ANDREW J. LONGENECKER.

Witnesses:
ARTHUR I. GRAY,
F. CREUTZ.